July 29, 1941.    C. W. GORDON    2,250,864
HEAT EXCHANGER
Filed Sept. 22, 1939    2 Sheets-Sheet 1
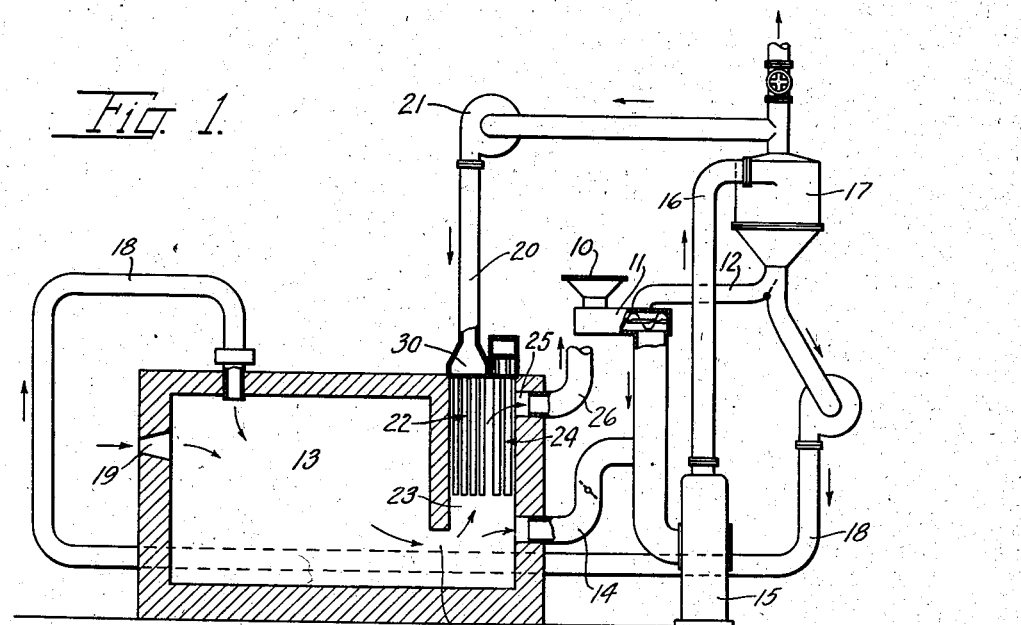
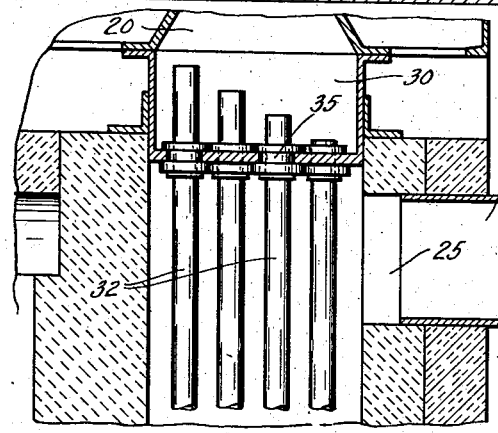
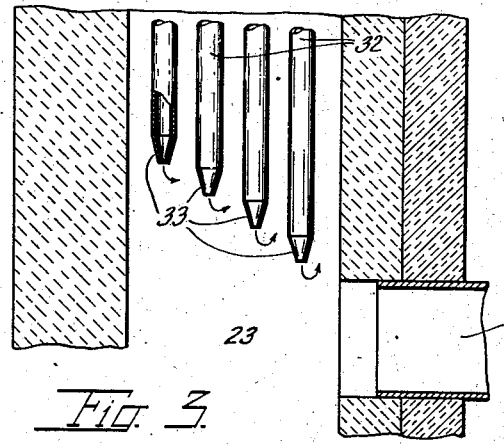
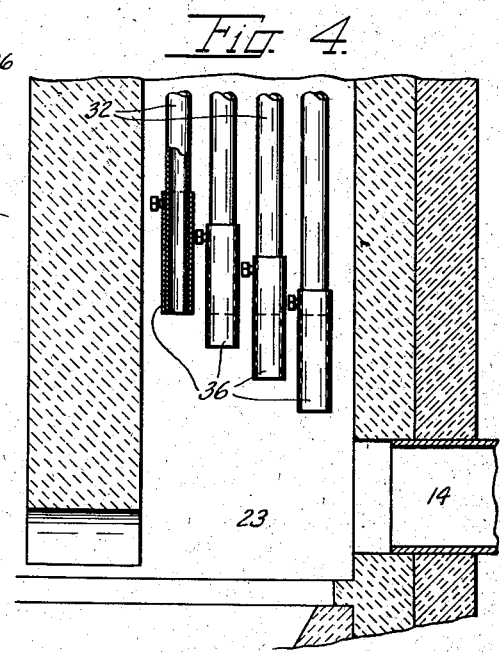
INVENTOR
CHARLES W. GORDON.
BY
ATTORNEY

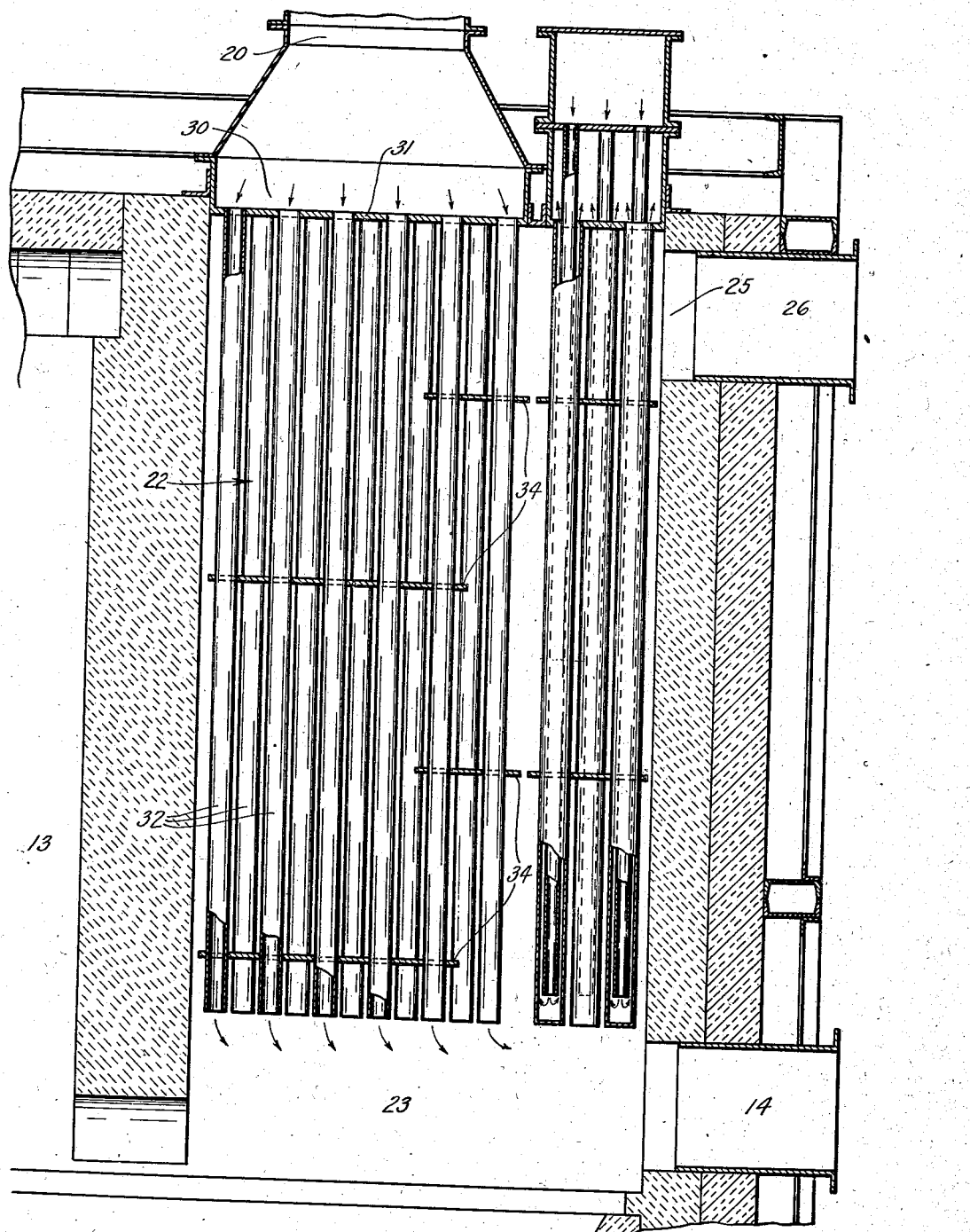

Patented July 29, 1941

2,250,864

UNITED STATES PATENT OFFICE 2,250,864

HEAT EXCHANGER

Charles W. Gordon, Glen Ellyn, Ill., assignor to Combustion Engineering Company, Inc., New York, N. Y.

Application September 22, 1939, Serial No. 296,028

4 Claims. (Cl. 183—6)

This invention relates to heat exchange apparatus and particularly to such apparatus adapted for use in raising the temperature of gases that are to be deodorized by heating them.

Heat exchangers have been used heretofore to raise the temperature of odorous gaseous fluids to a deodorizing temperature. For example, gases separated from sewage sludge when drying it have been passed through an air heater type of heat exchanger and heated therein by gases from a furnace, which thusly are in turn partially cooled. This furnace may also provide the heat for drying the sludge. The odorous gases after leaving the heat exchanger are discharged into the furnace gases at a point in advance of the offtake of the furnace and thoroughly intermingled with the furnace gases. The temperature and quantity of both the heated sludge gases and the furnace gases are such that when they commingle, the resulting mixture will be at a temperature at least as high as that required for deodorizing the odorous gases.

It is an object of this invention to provide an improved heat exchanger suitable to the above mentioned purpose or equivalent purposes. The invention will be best understood upon consideration of the following detailed description of an illustrative embodiment thereof when read in conjunction with the accompanying drawings in which Fig. 1 is a diagrammatic view of sludge drying apparatus embodying the present invention.

Fig. 2 is an enlarged longitudinal sectional view showing the heat exchange apparatus of the present invention in conjunction with a furnace; and Figs. 3 and 4 are fragmentary views illustrating modifications of details embodied in the heat exchange apparatus.

Referring first to Fig. 1, sewage sludge from which most of the moisture has been removed, as by pressing, is admitted at 10 to a mixer 11 which also receives an amount of previously dried sludge through a conduit 12. The mixture is then carried by fresh hot gas coming from a furnace 13 through a conduit 14 into a drier 15 where an intimate commingling of the sludge and gases effects drying. The mixture of gas and dried sludge then passes through a conduit 16 to a cyclone separator 17, part of the dried sludge going to the mixer 11 through conduit 12 and the remainder by a conduit 18 to be discharged into furnace 13 wherein the dried sludge is burned. Burners 19 for fuel oil or pulverized coal may be utilized to provide any additional heat needed for burning of the sludge.

The gases which have given up heat to evaporation of moisture in drying the sludge are, when leaving separator 17, at a temperature too low for effecting deodorization and are therefore delivered through conduit 20 and fan 21 into a heat exchanger, designated as a whole by the numeral 22 in Fig. 1. The odorous gases pass through heat exchanger 22 while hotter gases pass over the surfaces of the heat exchanger so that the odorous gases have their temperature raised somewhat before being discharged into a duct 23 near the inlet 23A to the latter from furnace 13. Upon mixing with the hot gases from the furnace the temperature of the odorous gases is further raised to at least a temperature capable of causing deodorization. The mixture passes over the surfaces of the exchanger 22, and may also flow over an air preheater 24 for supplying air for combustion to furnace 13, and thus yields part of its heat before being discharged by way of outlet 25 from duct 22 to a conduit 26 leading, for example, to the stack.

The heat exchanger as illustrated in Fig. 2 comprises the vertical duct 23 having at one end the inlet 23A communicating with the furnace chamber 13 and at the opposite end the outlet 25. There is also an opening for the conduit 14 leading to the drier 15. At the end of the duct 23 adjacent its outlet 25 is a chamber 30 for receiving the odorous gases from the separator 17 via conduit 20. The chamber 30 is closed at one end by a tube sheet 31 into which one end of each of a number of tubular heat exchange elements 32 are connected. The other ends of these tubes are open so as to discharge the odorous gases into the duct 22 near furnace gas inlet 23A thereto. To provide an intimate mixture of the odorous gases with the furnace gases the tubes may be provided with nozzles 33, 33 at their outlet ends, as illustrated in Fig. 3, to increase the discharge velocity of the odorous gases.

With this arrangement it will be noted that the odorous gases flow through the tubes 32 in countercurrent relationship to the mixture of furnace gases and preheated odorous gases passing over the outside of the tubes to outlet 25. To assure a more intimate contact of the gas mixture with the surfaces of the tubes and also those of the air preheater 24, transverse baffles 34 may be arranged in staggered relation across the duct.

In installations where baffles are not employed in the duct 23, it may be desirable to have the tubes 32 adjustable to various individual lengths to more effectively intermix and distribute the mixed gases more favorably in their flow over the outer surfaces of the tubes as they pass to its outlet 25. For example, it may be desirable to have long tubes on the duct wall having the outlet 25 therein and progressively shorter ones in rows toward the opposite wall in order to provide resistance to gas flow directly along the wall having the outlet therein. This may be accomplished by providing slidable connections 35 between the tubes 32 and tube sheet 31 as shown in Fig. 3. In such case the chamber 30 must be of sufficient height to receive the upper end portions of the tubes 32 that are not projected into the duct 22 to function as heat exchanger surface. Alternatively, the lower ends of the tubes 32 may be provided with adjustable telescopic sleeves 36 as illustrated in Fig. 4.

It may be seen from the foregoing that the improved heat exchanger is simple in construction and may be cheaply manufactured.

What I claim is:

1. Heat exchange apparatus for heating gases comprising; a duct having an inlet at one end and an outlet at the other; means defining a chamber adjacent said outlet for receiving gases to be heated; a plurality of tubes each connected at one end to said chamber and extending through said duct toward said inlet, the ends of said tubes adjacent the duct inlet being free and uniformly distributed across said duct for discharging said gases from said tubes substantially uniformly into said duct adjacent its inlet; and means for supplying gases to be heated to said chamber and hot gases to the inlet of said duct to mix with gases discharged from said tubes and flow therewith over the latter to said outlet.

2. Heat exchange apparatus for heating gases comprising; a duct having an inlet at one end and an outlet at the other; means defining a chamber adjacent said outlet for receiving gases to be heated; a plurality of tubes each connected at one end to said chamber and extending through said duct toward said inlet, the ends of said tubes adjacent the duct inlet being free and uniformly distributed across said duct for discharging said gases from said tubes substantially uniformly into said duct adjacent its inlet; and means for supplying gases to be heated to said chamber and hot gases to the inlet of said duct to mix with gases discharged from said tubes and flow therewith over the latter to said outlet, the inlet and outlet of said duct being on opposite walls thereof and the tubes adjacent the wall having said outlet therein being longer than the tubes in other parts of the duct.

3. Heat exchange apparatus for heating gases comprising; a duct having an inlet at one end and an outlet at the other; means defining a chamber adjacent said outlet for receiving gases to be heated; a plurality of tubes each connected at one end to said chamber and extending through said duct toward said inlet, the ends of said tubes adjacent the duct inlet being free and uniformly distributed across said duct for discharging said gases from said tubes substantially uniformly into said duct adjacent its inlet; and means for supplying gases to be heated to said chamber and hot gases to the inlet of said duct to mix with gases discharged from said tubes and flow therewith over the latter to said outlet, the tubular elements being connected into a tube sheet in said chamber and having adjustable connections to said sheet so that the length of the tube portion projecting into said duct may be varied.

4. Heat exchange apparatus for heating gases comprising; a duct having an inlet at one end and an outlet at the other; means defining a chamber adjacent said outlet for receiving gases to be heated; a plurality of tubes each connected at one end to said chamber and extending through said duct toward said inlet, the ends of said tubes adjacent the duct inlet being free and uniformly distributed across said duct for discharging said gases from said tubes substantially uniformly into said duct adjacent its inlet; means for supplying gases to be heated to said chamber and hot gases to the inlet of said duct to mix with gases discharged from said tubes and flow therewith over the latter to said outlet; and adjustable sleeves being mounted on the ends of the tubular elements located in said duct so that the length of certain tubes may be varied.

CHARLES W. GORDON.